(12) United States Patent
Suzuki et al.

(10) Patent No.: US 10,334,634 B2
(45) Date of Patent: Jun. 25, 2019

(54) TERMINAL DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 10 days.

(21) Appl. No.: 15/545,795

(22) PCT Filed: Jan. 26, 2016

(86) PCT No.: PCT/JP2016/052108
§ 371 (c)(1),
(2) Date: Jul. 24, 2017

(87) PCT Pub. No.: WO2016/121731
PCT Pub. Date: Aug. 4, 2016

(65) Prior Publication Data
US 2018/0020484 A1 Jan. 18, 2018

(30) Foreign Application Priority Data

Jan. 28, 2015 (JP) .................................. 2015-014736
Oct. 29, 2015 (JP) .................................. 2015-212701

(51) Int. Cl.
*H04W 74/08* (2009.01)
*H04W 72/04* (2009.01)
*H04W 72/12* (2009.01)

(52) U.S. Cl.
CPC ....... *H04W 74/0833* (2013.01); *H04W 72/04* (2013.01); *H04W 72/12* (2013.01); *H04W 72/1284* (2013.01); *H04W 74/08* (2013.01)

(58) Field of Classification Search
CPC . H04W 74/0833; H04W 72/04; H04W 72/12; H04W 72/1284; H04W 74/08;
(Continued)

(56) References Cited

U.S. PATENT DOCUMENTS 8,917,605 B2 * 12/2014 Pelletier .............. H04W 52/365
370/236
8,995,370 B2 * 3/2015 Pelletier ............ H04W 72/0453
370/329

(Continued)

OTHER PUBLICATIONS

Nokia Corporation et al.,Title: New WI proposal: LTE Carrier Aggregation Enhancement Beyond 5 Carriers; 3GPP TSG RAN Meeting #66,;Maui, Hawaii (US), Dec. 8-11, 2014; RP-142286. Document for: Decision; Agenda Item: 14.1.1.

(Continued)

*Primary Examiner* — Wutchung Chu
(74) *Attorney, Agent, or Firm* — ScienBiziP, P.C.

(57) ABSTRACT

In a first case, in which a condition is satisfied that includes at least conditions that at least one scheduling request is pending in a certain TTI, there is no UL-SCH resource available for transmission in the certain TTI, and a terminal device has a valid resource for a physical uplink control channel for the scheduling request configured for the certain TTI, when a value of a counter is equal to a prescribed value or larger than the prescribed value, the terminal device initiates a random access procedure on a primary cell, releases a PUCCH resource for a scheduling request in a serving cell other than the primary cell, and cancels all pending scheduling requests.

4 Claims, 5 Drawing Sheets

(58) Field of Classification Search
CPC ............ H04W 24/04; H04W 72/0406; H04W 72/0413; H04W 72/1278; H04W 74/0808; H04W 72/1268; H04W 72/1289; H04W 72/14; H04W 52/146; H04L 5/0055; H04L 5/0016; H04L 5/0053; H04L 5/0091
See application file for complete search history.

(56) References Cited

U.S. PATENT DOCUMENTS

| | | | | |
|---|---|---|---|---|
| 9,301,183 | B2* | 3/2016 | Heo | H04W 4/70 |
| 9,603,038 | B2* | 3/2017 | Tseng | H04W 24/02 |
| 9,750,051 | B2* | 8/2017 | Ohta | H04L 5/001 |
| 2008/0316959 | A1* | 12/2008 | Bachl | H04L 1/1671 |
| | | | | 370/329 |
| 2009/0175159 | A1* | 7/2009 | Bertrand | H04W 72/0406 |
| | | | | 370/203 |
| 2009/0176502 | A1* | 7/2009 | Kuo | H04W 72/14 |
| | | | | 455/450 |
| 2009/0196236 | A1* | 8/2009 | Cai | H04L 47/10 |
| | | | | 370/329 |
| 2009/0238121 | A1* | 9/2009 | Kotecha | H04L 1/0026 |
| | | | | 370/329 |
| 2009/0291701 | A1* | 11/2009 | Zetterman | H04W 72/1215 |
| | | | | 455/509 |
| 2010/0111067 | A1* | 5/2010 | Wu | H04W 74/008 |
| | | | | 370/345 |
| 2010/0184445 | A1* | 7/2010 | Tseng | H04W 72/1284 |
| | | | | 455/450 |
| 2012/0176967 | A1* | 7/2012 | Kim | H04W 76/36 |
| | | | | 370/328 |
| 2014/0092865 | A1* | 4/2014 | Heo | H04W 4/70 |
| | | | | 370/331 |
| 2014/0295860 | A1* | 10/2014 | Kuo | H04W 24/02 |
| | | | | 455/450 |
| 2016/0029387 | A1* | 1/2016 | Uemura | H04W 48/18 |
| | | | | 370/329 |
| 2016/0065345 | A1* | 3/2016 | Kim | H04W 72/0406 |
| | | | | 370/330 |
| 2016/0219475 | A1* | 7/2016 | Kim | H04L 5/00 |
| 2017/0013565 | A1* | 1/2017 | Pelletier | H04W 52/146 |
| 2017/0164419 | A1* | 6/2017 | Kim | H04L 5/00 |
| 2017/0367103 | A1* | 12/2017 | Suzuki | G06F 21/31 |
| 2018/0013533 | A1* | 1/2018 | Yang | H04L 1/1671 |
| 2018/0020473 | A1* | 1/2018 | Suzuki | H04W 72/04 |
| 2018/0027548 | A1* | 1/2018 | Suzuki | H04W 72/04 |
| | | | | 370/329 |
| 2018/0049188 | A1* | 2/2018 | Kim | H04W 24/10 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.4.0, Dec. 2014.

3rd Generation Partnership Project; Technical Specification Group Radio Access Network; Evolved Universal Terrestrial Radio Access (E-UTRA); Physical layer procedures (Release 12); 3GPP TS 36.213 V12.4.0, Dec. 2014.

* cited by examiner

TERMINAL DEVICE, INTEGRATED CIRCUIT, AND COMMUNICATION METHOD

TECHNICAL FIELD

The present invention relates to a terminal device, an integrated circuit, and a communication method.

The present application claims priority based on Japanese Patent Application No. 2015-014736 filed on Jan. 28, 2015 and Japanese Patent Application No. 2015-212701 filed on Oct. 29, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been discussed. In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. A single base station device may manage a plurality of cells.

LTE supports a time division duplex (TDD). LTE that employs a TDD scheme is also referred to as TD-LTE or LTE TDD. In TDD, an uplink signal and a downlink signal are multiplexed in time division. Furthermore, LTE supports a frequency division duplex (FDD).

In the 3GPP, a carrier aggregation has been specified where a terminal device is capable of simultaneously performing transmission and/or reception in up to five serving cells (component carriers).

In the 3GPP, simultaneous transmission and/or reception by a terminal device in over five serving cells (component carriers) has been considered (NPL 1). Furthermore, a terminal device transmits a physical uplink control channel in a secondary cell that is a serving cell other than a primary cell is considered (NPL 1) has also been considered.

CITATION LIST

Non-Patent Document

[NON-PATENT DOCUMENT 1] NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.
[NON-PATENT DOCUMENT 2] NPL 2: "3GPP TS 36.321 v12.4.0 Evolved Universal Terrestrial Radio Access (E-UTRA); Medium Access Control (MAC) protocol specification", 5 Nov. 2015.
[NON-PATENT DOCUMENT 3] NPL 3: "3GPP TS 36.213 v12.4.0 Evolved Universal Terrestrial Radio Access (E-UTRA); Physical layer procedures", 7 Nov. 2015.

DISCLOSURE OF THE INVENTION

Problems to be Solved by the Invention

However, a specific method of transmitting, by a terminal device, a scheduling request to a base station device in a secondary cell that is a serving cell other than a primary cell, when a physical uplink control channel is transmitted, has not been sufficiently discussed.

The present invention has been made in of the above points, and an object thereof is to provide a terminal device capable of effectively communicating with a base station device by using a plurality of cells (component carriers), an integrated circuit mounted in the terminal device, a communication method used for the terminal device, a base station device configured to communicate with the terminal device, an integrated circuit mounted in the base station device, and a communication method used for the base station device.

Means for Solving the Problems (1) To accomplish the object described above, aspects of the present invention are contrived to provide the following means. That is, a first aspect of the present invention is a terminal device configured to execute a random access procedure on a first serving cell and a random access procedure on a second serving cell. The device comprises: a medium access control (MAC) layer processing unit configured to (a) increment a value of a counter by 1 and (b) instruct a transmission unit to transmit a scheduling request via a physical uplink control channel, in a first case in which at least conditions are satisfied that at least one scheduling request is pending in a certain transmission time interval (TTI), there are no uplink shared channel (UL-SCH) resources available for transmission in the certain TTI, and the terminal device has a valid resource for the physical uplink control channel for the scheduling request configured for the certain TTI, when the value of the counter is smaller than a prescribed value; and the transmission unit configured to transmit the scheduling request via the physical uplink control channel in the second serving cell, when a resource for the physical uplink control channel for the scheduling request is configured only in the second serving cell in the certain TTI. The MAC layer processing unit initiates a random access procedure on the first serving cell, in the first case, when the value of the counter is equal to the prescribed value or larger than the prescribed value, out of the first serving cell that is a cell instructed in a handover procedure and the second serving cell in which the resource for the physical uplink control channel for the scheduling request is configured.

(2) A second aspect of the present invention is an integrated circuit mounted in a terminal device configured to execute a random access procedure on a first serving cell and a random access procedure on a second serving cell. The circuit comprises: a medium access control (MAC) layer processing circuit configured to (a) increment a value of a counter by 1 and (b) instruct, a transmission circuit to transmit a scheduling request via a physical uplink control channel, in a first case in which at least conditions are satisfied that at least one scheduling request is pending in a certain transmission time interval (TTI), there are no uplink shared channel (UL-SCH) resources available for transmission in the certain TTI, and the terminal device has a valid resource for the physical uplink control channel for the scheduling request configured for the certain TTI, when the value of the counter is smaller than a prescribed value; and the transmission circuit configured to transmit the scheduling request via the physical uplink control channel in the second serving cell, when a resource for the physical uplink control channel for the scheduling request is configured only in the second serving cell in the certain TTI. The MAC layer processing circuit initiates, in the first case, when the value of the counter is equal to the prescribed value or larger than the prescribed value, the random access procedure on the first serving cell, out of the first serving cell that is a cell instructed in a handover procedure and the second serving cell in which the resource for the physical uplink control channel for the scheduling request is configured.

(2) Furthermore, a third aspect of the present invention is a communication method used for a terminal device, the method comprising the steps of: executing a random access procedure on a first serving cell and a random access procedure on a second serving cell; (a) incrementing a value of a counter by 1 and (b) instructing transmission of a scheduling request via a physical uplink control channel, in a first case in which at least conditions are satisfied that at least one scheduling request is pending in a certain transmission time interval (TTI), there are no uplink shared channel (UL-SCH) resources available for transmission in the certain TTI, and the terminal device has a valid resource for the physical uplink control channel for the scheduling request configured for the certain TTI, when the value of the counter is smaller than a prescribed value; and transmitting the scheduling request via the physical uplink control channel in the second serving cell, when the resource for the physical uplink control channel for the scheduling request is configured only in the second serving cell in the certain TTI. In the first case, when the value of the counter is equal to the prescribed value or larger than the prescribed value, the random access procedure on the first serving cell, out of the first serving cell that is a cell instructed in a handover procedure and the second serving cell in which the resource for the physical uplink control channel for the scheduling request is configured, is initiated.

Effects of the Invention

According to the present invention, a terminal device can effectively communicate with a base station device by using a plurality of cells (component carriers).

MODE FOR CARRYING OUT THE INVENTION

Embodiments of the present invention will be described below.

Figure 1:
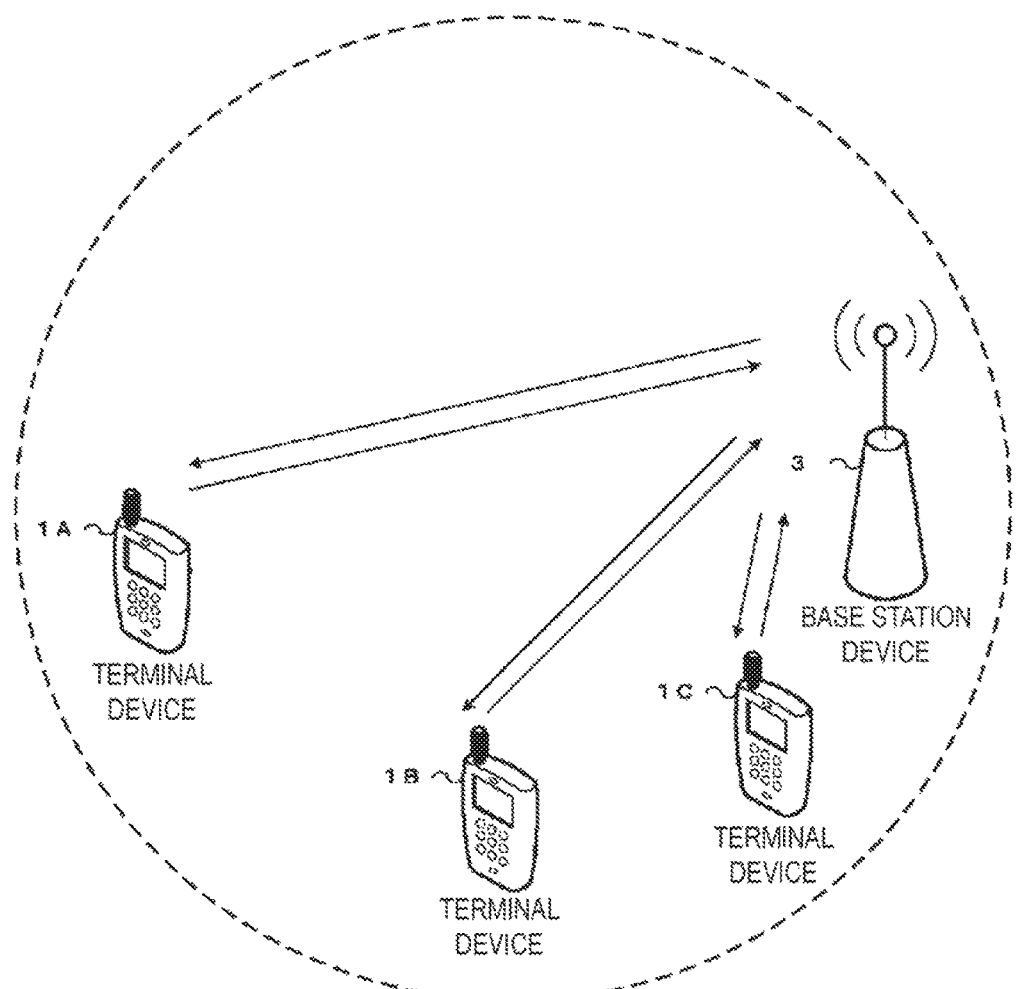
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each referred to as a terminal device 1.

A carrier aggregation will be described below.

In the present embodiment, a plurality of serving cells are configured for the terminal device 1. A technology in which the terminal device 1 performs communication via a plurality of serving cells is referred to as cell aggregation or carrier aggregation. The present invention may be applied to each of the plurality of serving cells configured for the terminal device 1. Furthermore, the present invention may be applied to some of the plurality of configured serving cells. Furthermore, the present invention may be applied to each of groups of the plurality of configured serving cells. Moreover, the present invention may be applied to some of the groups of the plurality of configured serving cells. In the carrier aggregation, the plurality of configured serving cells are referred as aggregated serving cells.

Time Division Duplex (TDD) and/or Frequency Division Duplex (FDD) are applied to the radio communication system according to the present embodiment. In a case of cell aggregation, the TDD may be applied to all of the plurality of serving cells. Furthermore, in a case of cell aggregation, a serving cell to which the TDD is applied and a serving cell to which the FDD is applied may be aggregated.

The plurality of configured serving cells include one primary cell and one or a plurality of secondary cells. The primary cell is a serving cell in which an initial connection establishment procedure has been performed, a serving cell in which a connection re-establishment procedure has been initiated, or a cell indicated as a primary cell during a handover procedure. At a point of time when a radio resource control (RRC) connection is established, or later, a secondary cell may be configured.

In a downlink, a carrier corresponding to a serving cell is referred to as a downlink component carrier. In an uplink, a carrier corresponding to a serving cell is referred to as an uplink component carrier. The downlink component, carrier and the uplink component carrier are collectively referred to as a component carrier.

In a plurality of serving cells (component carriers), the terminal device 1 is capable of simultaneous transmission and/or reception on a plurality of physical channels. One physical channel is transmitted in one serving cell (component carrier) out of the plurality of serving cells (component carriers).

In the present embodiment, a secondary cell used for transmitting a physical uplink control channel (PUCCH) is referred to as a special secondary cell or a PUCCH secondary cell. In the present embodiment, a secondary cell not used for transmitting PUCCH is referred to as a non-special secondary cell, a non-PUCCH secondary cell, a non-PUCCH serving cell, or a non-PUCCH cell. The primary cell and the special secondary cell are collectively referred to as a PUCCH serving cell, or a PUCCH cell.

The PUCCH serving cell (primary cell, PUCCH secondary cell) includes a downlink component carrier and an uplink component carrier. In the PUCCH serving cell (primary cell, PUCCH secondary cell), a PUCCH resource is configured.

The non-PUCCH serving cell (non-PUCCH secondary cell) may include a downlink component carrier only. The non-PUCCH serving cell (non-PUCCH secondary cell) may include a downlink component carrier and an uplink component carrier.

In a PUCCH serving cell, the terminal device 1 performs transmission on PUCCH. In a primary cell, the terminal device 1 performs transmission on PUCCH. In a special secondary cell, the terminal device 1 performs transmission on PUCCH. In a non-special secondary cell, the terminal device 1 does not perform transmission on PUCCH.

Note that the special secondary cell may be defined as a serving cell that is neither a primary cell nor a secondary cell.

A physical channel and a physical signal according to the present embodiment will be described.

In FIG. 1, in uplink radio communication from the terminal device 1 to the base station device 3, the following uplink physical channels are used. The uplink physical channel is used to transmit information output from a higher layer.

Physical uplink control channel (PUCCH)
Physical uplink shared channel (PUSCH)
Physical random access channel (PRACH)

The PUCCH is used to transmit uplink control information (UCI). The uplink control information includes downlink channel state information (CSI), a scheduling request (SR) used for requesting an uplink-shared channel (UL-SCH) (PUSCH) resource for an initial transmission, a hybrid automatic repeat request acknowledgement (HARQ-ACK) for downlink data (a transport block, a medium access control protocol data unit (MAC PDU), a downlink-shared channel (DL-SCH), a physical downlink shared channel (PDSCH)). The HARQ-ACK indicates an acknowledgment (ACK) or a negative-acknowledgment (NACK). The HARQ-ACK is also referred to as an ACK/NACK, HARQ feedback, HARQ response, HARQ information, or HARQ control information.

The scheduling request includes a positive scheduling request or a negative scheduling request. The positive scheduling request indicates that a UL-SCH resource for an initial transmission is requested. The negative scheduling request indicates that a UL-SCH resource for an initial transmission is not requested.

A PUCCH format 1 is used to transmit a positive scheduling request. A PUCCH format 1a is used to transmit a 1-bit HARQ-ACK. A PUCCH format 1b is used to transmit a 2-bit HARQ-ACK. The PUCCH format 1b, which accompanies a channel selection, is used to transmit an HARQ-ACK of up to 4 bits when two or more serving cells are configured to a terminal device. A PUCCH format 3 may be used to transmit an HARQ-ACK only. The PUCCH format 3 may be used to transmit an HARQ-ACK and a scheduling request (a positive scheduling request or a negative scheduling request)

The PUSCH is used to transmit uplink data (uplink-shared channel (UL-SCH)). Furthermore, the PUSCH may be used to transmit, along with the uplink data, the HARQ-ACK and/or channel state information. Furthermore, the PUSCH may be used to transmit only the channel state information or to transmit only the HARQ-ACK and the channel state information.

Here, the base station device 3 and the terminal device 1 exchange (transmit and receive) a signal in a higher layer. For example, the base station device 3 and the terminal device 1 may transmit and receive an RRC signaling, which is also referred to as a radio resource control message (RRC message) or radio resource control information (RRC information), in a radio resource control (RRC) layer. Furthermore, the base station device 3 and the terminal device 1 may transmit and receive a MAC CE in a medium access control (MAC) layer. Here, the RRC signaling and/or the MAC CE is also referred to as a higher layer signaling.

The PUSCH is used to transmit the RRC signaling and the MAC CE. Here, an RRC signaling transmitted from the base station device 3 may be a signaling common to a plurality of terminal devices 1 within a cell. Furthermore, the RRC signaling transmitted from the base station device 3 may be a signaling dedicated to a certain terminal device 1, which is also referred to as a dedicated signaling. That is, information specific to a user device user device-specific information) is transmitted to a certain terminal device 1 by using a dedicated signaling.

The PRACH is used to transmit a random access preamble. The PRACH is used for an initial connection establishment procedure, a handover procedure, a connection re-establishment procedure, a synchronization (timing adjustment) for uplink transmission, and a request for a PUSCH (UL-SCH) resource.

In FIG. 1, in the uplink radio communication, the following uplink physical signal is used. The uplink physical signal is not used to transmit information outputted from the higher layer, but is used by a physical layer.

Uplink reference signal (UL RS)

In the present embodiment, the following two types of uplink reference signals are used.

Demodulation reference signal (DMRS)
Sounding reference signal (SRS)

The DMRS relates to transmission of the PUSCH or the PUCCH. The DMRS is time-multiplexed with the PUSCH or the PUCCH. The base station device 3 uses the DMRS in order to perform channel compensation of the PUSCH or the PUCCH. Hereinafter, transmission of both of the PUSCH and the DMRS is referred simply to as transmission of the PUSCH. Hereinafter, transmission of both of the PUCCH and the DMRS is referred simply to as transmission of the PUCCH.

The SRS is not related to the transmission of the PUSCH or the PUCCH. The base station device 3 uses the SRS in order to measure an uplink channel state.

In FIG. 1, for downlink radio communication from the base station device 3 to the terminal device 1, the following downlink physical channels are used. The downlink physical channel is used to transmit the information output from the higher layer.

Physical broadcast channel (PBCH)
Physical control format indicator channel (PCFICH)
Physical hybrid automatic repeat request indicator channel (PHICH)
Physical downlink control channel (PUCCH)
Enhanced physical downlink control channel (EPDCCH)
Physical downlink shared channel (PDSCH)
Physical multicast channel (PMCH)

The PBCH is used to broadcast a master information block (MIB), or broadcast channel (BCH), that is commonly used in the terminal devices 1.

The PCFICH is used to transmit information instructing a region (OFDM symbol) to be used for transmission of the PDCCH.

The PHICH is used to transmit an HARQ indicator (HARQ feedback, response information) indicating an acknowledgement (ACK) or a negative acknowledgement (NACK) with respect to the uplink data (uplink shared channel (UL-SCH)) received by the base station device 3.

The PDCCH and the EPDCCH are used to transmit downlink control information (DCI). The downlink control information is also referred to as DCI format. The downlink control information includes a DCI format 3, a DCI format 3A, a downlink grant, and an uplink grant. The downlink grant is also referred to as downlink assignment or downlink allocation.

The downlink grant is used for scheduling of a single PDSCH within a single cell. The downlink grant is used for the scheduling of the PDSCH within the same subframe as the subframe in which the downlink grant is transmitted.

The uplink grant is used for scheduling of a single PDSCH within a single cell. The uplink grant is used for scheduling of a single PDSCH within a fourth or later subframe after the subframe in which the uplink grant is transmitted. The uplink grant includes a TPC command for the PDSCH.

CRC parity bits added to the downlink grant or the uplink grant are scrambled with a cell-radio network temporary identifier (C-RNTI) or a semi persistent scheduling cell-radio network temporary identifier (SPS C-RNTI). The C-RNTI and the SPS C-RNTI are identifiers for identifying a terminal device within the cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)),

In FIG. 1, in the downlink radio communication, the following downlink physical signals are used. The downlink physical signal is not used to transmit the information output from the higher layer, but is used by the physical layer.

Synchronization signal (SS)

Downlink reference signal (DL RS)

The synchronization signal is used in order for the terminal device 1 to be synchronized in terms of a frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform the channel compensation of the downlink physical channel. The downlink reference signal is used in order for the terminal device 1 to calculate the downlink channel state information.

In the present embodiment, the following five types of downlink reference signals are used.

Cell-specific reference signal (CRS)

UE-specific reference signal (URS) relating to the PDSCH

Demodulation reference signal (DMRS) relating to the EPDCCH

Non-zero power channel state information—reference signal (NZP CSI-RS)

Zero power channel state information—reference signal (ZP CSI-RS)

Multimedia broadcast and multicast service over single frequency network reference signal (MBSFN RS)

Positioning reference signal (PRS)

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. A unit of the transport channel used in the MAC layer is referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

In the present embodiment, a random access procedure may be performed in the primary cell and the secondary cell. However, at any point in the time domain, only one random access procedure is performed. That is, a plurality of random access procedures are not performed simultaneously.

In the primary cell, the PRACH may be transmitted. The terminal device 1 receives information regarding the random access procedure in the primary cell (RRC message) from the base station device 3. The information regarding the random access procedure in the primary cell includes information indicating a set of PRACH resources in the primary cell.

In the secondary cell, the PRACH may be transmitted. The terminal device 1 receives information regarding the random access procedure in the secondary cell (RRC message) from the base station device 3. The information regarding the random access procedure in the secondary cell includes information indicating a set of PRACH resources in the secondary cell.

In the present embodiment, a group of a plurality of serving cells is referred to as a PUCCH cell group. A certain serving cell belongs to any one of the PUCCH cell groups.

One PUCCH cell group may include one or a plurality of PUCCH serving cells. One PUCCH cell group may include only one PUCCH serving cell. One PUCCH cell group may include one PUCCH serving cell and one or a plurality of non-PUCCH serving cells.

A PUCCH cell group including the primary cell is referred to as a primary PUCCH cell group. A PUCCH cell group that does not include the primary cell is referred to as a secondary PUCCH cell group. That is, the secondary PUCCH cell group includes a PUCCH secondary cell.

An index (cell group index) for identifying a PUCCH cell group may be defined. An index for the primary PUCCH cell group is always 0. An index for the secondary PUCCH cell group may be configured by a network device (base station device 3).

PUCCH of the PUCCH serving cell is used to transmit uplink control information (an HARQ-ACK and/or a CSI) for a serving cell (PUCCH serving cell, non-PUCCH serving cell) included in the PUCCH cell group to which the PUCCH serving cell belongs.

That is, the uplink control information (an HARQ-ACK and/or a CSI) for a serving cell (PUCCH serving cell, non-PUCCH serving cell) included in the PUCCH cell group is transmitted by using the PUCCH in a PUCCH serving cell included in the PUCCH cell group.

For example, uplink control information (an HARQ-ACK and/or a CSI) for a serving cell included in the primary PUCCH cell group may be transmitted by using the PUCCH in a PUCCH secondary cell included in the primary PUCCH cell group.

The PUCCH cell group for the HARQ-ACK and the PUCCH cell group for the CSI may be individually defined. The PUCCH cell group for the HARQ-ACK and the PUCCH cell group for the CSI may be common.

The scheduling request is transmitted in one PUCCH serving cell out of a plurality of PUCCH serving cells. In the plurality of PUCCH serving cells, a plurality of scheduling requests are not transmitted simultaneously. The scheduling request may be transmitted via the PUCCH in the primary cell. The scheduling request may be transmitted via the PUCCH in the special secondary cell.

In one PUCCH serving cell out of a plurality of PUCCH serving cells, a PUCCH resource for a scheduling request is configured. In the PUCCH resource for a scheduling request, the PUCCH format 1 is transmitted. The uplink subframe including the PUCCH resource (PUCCH format 1) for a scheduling request is referred to as an instance of scheduling request transmission. The instance of scheduling request transmission is a periodic uplink subframe.

The instance of scheduling request transmission is configured by the higher layer. The base station device 3 transmits information indicating the instance of scheduling request transmission (an RRC message) to the terminal device 1. The information indicating the instance of scheduling request transmission indicates a period and an offset. The base station device 3 transmits information indicating the serving cell in which the PUCCH resource for the scheduling request is configured, to the terminal device 1. The subframe is also referred to as a transmission time interval (TTI).

Figure 2:
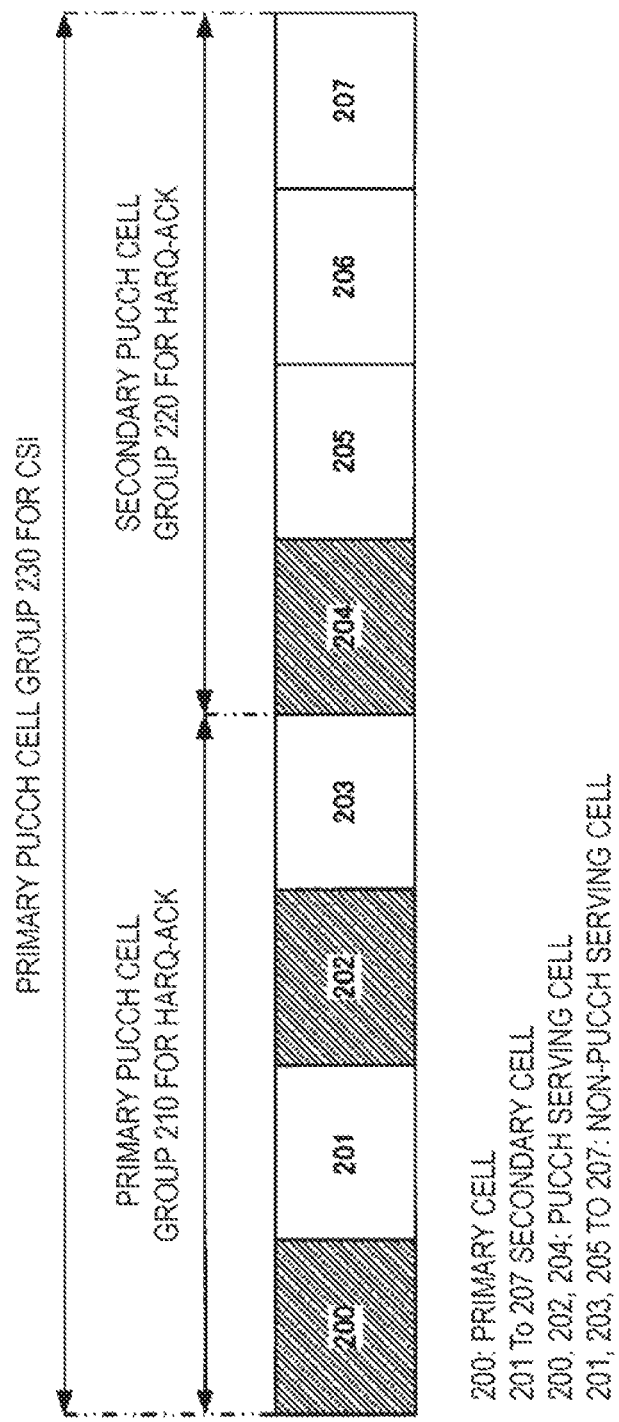
FIG. 2 is a diagram illustrating one example of a PUCCH cell group in the present embodiment.

FIG. 2 is a diagram illustrating one example of the PUCCH cell group in the present embodiment.

In FIG. 2, squares labeled with 200 to 207 each indicate a serving cell to be aggregated. In FIG. 2, a serving cell 200 is the primary cell, and the serving cells 201 to 207 are the secondary cells. In FIG. 2, the serving cells 200, 202, and 204 are the PUCCH serving cells, and the serving cells 201, 203, 205, 206, and 207 are the non-PUCCH serving cells.

In FIG. 2, the PUCCH cell group for the HARQ-ACK includes a primary PUCCH cell group 210 and a secondary PUCCH cell group 220. The primary PUCCH cell group 210 for the HARQ-ACK includes the serving cells 200 to 203. The HARQ-ACK for the serving cells 200 to 203 included in the primary PUCCH cell group 210 for the HARQ-ACK may be transmitted by using the PUCCH in either the serving cell 200 or 202.

The primary PUCCH cell group 220 for the HARQ-ACK includes the serving cells 204 to 207. The HARQ-ACK for the serving cells 204 to 207 included in the primary PUCCH cell group 220 for the HARQ-ACK may be transmitted by using the PUCCH in the serving cell 204.

In FIG. 2, the PUCCH cell group for the CSI includes only one primary PUCCH cell group 230. The primary PUCCH cell group 230 for the CSI includes the serving cells 200 to 207. The CSI for the serving cells 200 to 207 included in the primary PUCCH cell group 230 for the CSI may be transmitted by using the PUCCH in any one of serving cells 200, 202, and 204.

In FIG. 2, the SR may be transmitted by using the PUCCH in any one of the serving cells 200, 202, and 204.

Processing related to a scheduling request will be described below.

When a scheduling request is triggered, the scheduling request is assumed to be pending until the scheduling request is canceled. When a scheduling request is triggered and there is no other pending scheduling request, the terminal device 1 sets a counter SR_COUNTER to 0.

Figure 3:
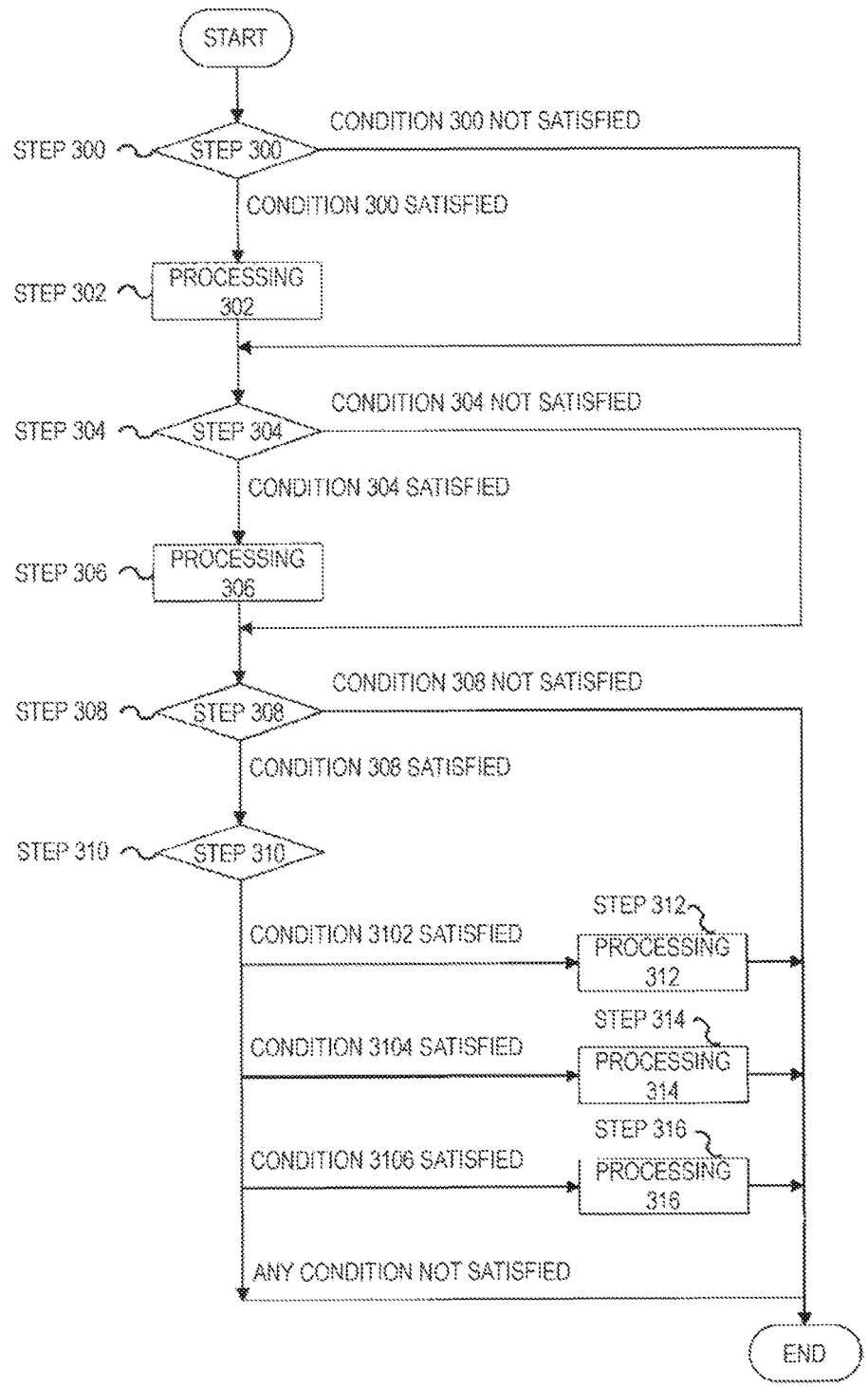
FIG. 3 is a diagram illustrating one example of a process involving a scheduling request executed for each of subframes (TTIs), in the present embodiment.

FIG. 3 is a diagram illustrating an example of processing related to a scheduling request to be executed for each of the subframes (TTIs), in the present embodiment. The processing in FIG. 3 is executed in the MAC layer. The terminal device 1 executes, while at least one scheduling request is pending, the processing in FIG. 3 for each of the subframes having no UL-SCH available for the transmission. Note that specific processing is not limited to the processing in FIG. 3, but also includes processing modified by replacing/adding/eliminating, for example, a step without departing from the gist of the present invention. Furthermore, the processing in FIG. 3 may be modified in various forms within the scope of the claims, and embodiments obtained by appropriately combining technical means disclosed also fall within the technical scope of the present invention.

In step 300, the terminal device 1 determines whether or not conditions included in a condition 300 are satisfied. In step 300, when the conditions included in the condition 300 are satisfied, the terminal device 1 proceeds to step 302. In step 300, when the conditions included in the condition 300 are not satisfied, the terminal device 1 proceeds to step 304. The condition 300 at least includes a condition that the terminal device 1 does not have a valid PUCCH resource for the scheduling request configured in any subframe. That is, the condition 300 at least includes a condition that a PUCCH resource is not configured in any serving cell.

In step S302, the terminal device 1 executes processing 302, and proceeds to step 304. The processing 302 at least includes processing of initiating the random access procedure on the primary cell and processing of canceling all pending scheduling requests.

In step 304, the terminal device 1 determines whether or not conditions included in a condition 304 are satisfied. In step 304, when the conditions included in the condition 304 are satisfied, the terminal device 1 proceeds to step 306. In step 304, when the conditions included in the condition 304 are not satisfied, the terminal device 1 proceeds to step 308. The condition 306 at least includes a condition that the terminal device 1 has the valid PUCCH resource for the scheduling request configured in this subframe, and a condition that a secondary cell in which the valid PUCCH resource for the scheduling request is configured in the subframe is deactivated. That is, the condition 306 at least includes a condition that in the subframe, the valid PUCCH resource for the scheduling request is configured in a secondary cell, but the secondary cell is deactivated.

In step S306, the terminal device 1 executes processing 306 and proceeds to step 308. The processing 306 at least includes processing of initiating the random access procedure on the primary cell. The processing 306 may further include processing of canceling all pending scheduling requests. In the processing 306, the terminal device 1 may not cancel the pending scheduling request. As a result, when the secondary cell in which the valid PUCCH resource for the scheduling request is configured is activated, it is possible to transmit the scheduling request as soon as possible.

In step 308, the terminal device 1 determines whether or not conditions included in a condition 308 are satisfied. In step 308, when the conditions included in the condition 308 are satisfied, the terminal device 1 proceeds to step 310. In step 308, when the conditions included in the condition 308 are not satisfied, the terminal device 1 terminates the processing for the TTI. The condition 308 at least includes a condition of having the valid PUCCH resource for the scheduling request configured in this subframe, a condition that this subframe is not a part of a measurement gap, and a condition that a timer sr-ProhibitTimer is not running. Furthermore, the condition 308 may include a condition that the serving cell (the primary cell or the secondary cell) in which the valid PUCCH resource for the scheduling request is configured in this subframe is activated. That is, the condition 308 at least includes a condition that in this subframe, the valid PUCCH resource for the scheduling request is configured in the serving cell and the serving cell is activated.

In step 310, the terminal device 1 determines whether or not the conditions included in a condition 310 are satisfied. In step 310, when none of the conditions included in the condition 310 are satisfied, the terminal device 1 terminates the processing for this TTI. The condition 310 includes a condition 3102, a condition 3104, and a condition 3106.

In step 310, when the conditions included in the condition 3102 are satisfied, the terminal device 1 proceeds to step 312. The condition 3102 at least includes a condition that a value of a counter SR_COUNTER is smaller than a prescribed value dsr-TransMax.

In step S312, the terminal device 1 executes processing 312. The processing 312 at least includes processing of incrementing the value of the counter SR_COUNTER by 1, processing of notifying/instructing the physical layer to signal the scheduling request using the PUCCH, and processing of starting the timer sr-Prohibit Timer.

The prescribed value dsr-TransMax may be controlled by the base station device 3. The base station device 3 may transmit information indicating the prescribed value dsr-TransMax to the terminal device 1. A default value of the prescribed value dsr-TransMax may be defined in advance.

In step 310, when the conditions included in the condition 3104 are satisfied, the terminal device 1 proceeds to step 314. The condition 3104 at least includes a condition that the value of the counter SR_COUNTER is equal to the prescribed value dsr-TransMax or larger than the prescribed value dsr-TransMax, and a condition that the PUCCH resource for the scheduling request is configured in the primary cell.

In step S314, the terminal device 1 executes processing 314. The processing 314 at least includes processing of notifying/instructing the RRC to release PUCCH/SRS for all serving cells, processing of clearing a configured downlink assignment and a configured uplink assignment, processing of initiating the random access procedure on the primary cells, and processing of canceling all pending scheduling requests. Here, the PUCCH for all serving cells may include the PUCCH for the CSI, the PUCCH for the HARQ-ACK, and/or the PUCCH for the scheduling request. Here, the uplink assignment is configured semi-statically.

In step 310, when the conditions included in the condition 3106 are satisfied, the terminal device 1 proceeds to step 316. The condition 3106 at least includes a condition that the value of the counter SR_COUNTER is equal to the prescribed value dsr-TransMax, or larger than the prescribed value dsr-TransMax, and a condition that the PUCCH resource for the scheduling request is configured in the secondary cell.

In step S316, the terminal device 1 executes processing 316. The processing 316 at least includes processing of notifying/instructing the RRC to release the PUCCH resource is configured for the scheduling request, processing of initiating the random access procedure on the primary cell, and processing of canceling all pending scheduling requests. In the processing 316, the configured downlink assignment and the configured uplink assignment may not be cleared. That is, in the processing 316, it may not be necessary to notify/instruct the RRC to release the PUCCH/SRS for all serving cells other than the secondary cell in which the PUCCH resource for the scheduling request is configured. Here, the PUCCH for the secondary cell in which the PUCCH resource for the scheduling request is configured may include PUCCH for the CSI, PUCCH for the HARQ-ACK, and/or PUCCH for the scheduling request. Here, the uplink assignment is configured semi-statically.

The RRC layer releases, on the basis of the notification instruction from the MAC layer, the PUCCH/SRS for all or some serving cells. That is, the RRC releases, on the basis of the instruction from the MAC layer, the resource of the PUCCH/SRS for all or some serving cells.

The physical layer signals, on the basis of the notification/instruction from the MAC layer, the scheduling request by using the PUCCH.

When only a positive scheduling request is transmitted, the terminal device 1 transmits the positive scheduling request by using the PUCCH resource for the scheduling request and the PUCCH format 1.

When SR transmission occurs in a subframe in which the PUCCH format 1a/1b (PUCCH format 1a or PUCCH format 1b) is transmitted, if the scheduling request is a negative scheduling request, the terminal device 1 transmits the HARQ-ACK by using the PUCCH resource for the HARQ-ACK.

When SR transmission occurs in a subframe in which the PUCCH format 1a/1b is transmitted, if the scheduling request is a positive scheduling request and the HARQ-ACID and the SR are transmitted in different serving cells, the terminal device 1 may transmit the positive scheduling request by using the PUCCH resource for the scheduling request and the PUCCH format 1, and may transmit the HARQ-ACK by using the PUCCH resource for the HARQ-ACK.

When SR transmission occurs in a subframe in which the PUCCH format 1a/1b is transmitted, if the scheduling request is a positive scheduling request and the HARQ-ACK and the SR are transmitted in different serving cells, the terminal device 1 may transmit the positive scheduling request by using the PUCCH resource for the scheduling request and the PUCCH format 1, and may drop the transmission of the HARQ-ACK.

When SR transmission occurs in a subframe in which the PUCCH format 1a/1b is transmitted, if the scheduling request is a positive scheduling request and the HARQ-ACK and the SR are transmitted in different serving cells, the terminal device 1 may drop the transmission of the positive scheduling request and transmit the HARQ-ACK by using the PUCCH resource for the HARQ-ACK.

When SR transmission occurs in a subframe in which the PUCCH format 1a/1b is transmitted, if the scheduling request is a positive scheduling request and both the HARQ-ACK and the SR are transmitted in the same serving cells, the terminal device 1 may transmit the HARQ-ACK by using the PUCCH resource for the scheduling request.

When SR transmission occurs in a subframe in which the PUCCH format 1b accompanying a channel selection is transmitted, if the scheduling request is a negative scheduling request, the terminal device 1 transmits the HARQ-ACK by using the PUCCH resource for the HARQ-ACK.

When SR transmission occurs in a subframe in which the PUCCH format 1b accompanying the channel selection is transmitted, if the scheduling request is a positive scheduling request and the HARQ-ACK and the SR are transmitted in different serving cells, the terminal device 1 may transmit the positive scheduling request by using the PUCCH resource for the scheduling request and the PUCCH format 1 and transmit the HARQ-ACK by using the PUCCH resource for the HARQ-ACK.

When SR transmission occurs in a subframe in which the PUCCH format 1b accompanying the channel selection is transmitted, if the scheduling request is a positive scheduling request and the HARQ-ACK and the SR are transmitted in different serving cells, the terminal device 1 may transmit the positive scheduling request by using the PUCCH resource for the scheduling request and the PUCCH format 1 and drop the transmission of HARQ-ACK.

When SR transmission occurs in a subframe in which the PUCCH format 1b accompanying the channel selection is transmitted, if the scheduling request is a positive scheduling request and the HARQ-ACK and the SR are transmitted in different serving cells, the terminal device 1 may drop the transmission of the positive scheduling request, and transmit the HARQ-ACK by using the PUCCH resource for the HARQ-ACK.

When SR transmission occurs in a subframe in which the PUCCH format 1b accompanying the channel selection is transmitted, if the scheduling request is a positive scheduling request and both the HARQ-ACK and the SR are transmitted in the same serving cells, the terminal device 1 may transmit 1-bit HARQ-ACK (HARQ-ACK indicated by using 1 bit of information bit, 1-bit HARQ-ACK) for each serving cell by using the PUCCH resource for the scheduling request. That is, for example, when 2-bit (b(0), b(1)) information bits are transmitted by using the PUCCH resource for the scheduling request, each of the 2-bit (b(0), b(1)) information bits corresponds to one serving cell.

Here, when only one transport block, or only the PDCCH/EPDCCH instructing one downlink semi persistent scheduling (SPS) release is detected in a serving cell, 1 bit of the HARQ-ACK for the serving cell is a bit of the HARQ-ACK corresponding to the one transport block or the PDCCH/EPDCCH instructing the one downlink SPS release. Here, when two transport blocks are received in a serving cell, 1 bit of the HARQ-ACK for the serving cell is created by spatially bundling two HARQ-ACK bits corresponding to the two transport blocks. The bundling is executed by a logical OR operation. Here, when both PDSCH transmission provided with the HARQ-ACK response and the PDCCH/EPDCCH instructing the downlink SPS release are not detected for the serving cell, the HARQ-ACK bit for the serving cell is set as NACK.

When the two PUCCH cell groups are configured for the terminal device 1, the PUCCH format 1b accompanying the channel selection is configured for each of the two PUCCH cell groups, and SR transmission occurs in a subframe in which the PUCCH format 1b accompanying the channel selection is transmitted, if the scheduling request is a positive scheduling request, the terminal device 1 may transmit 1 bit of HARQ-ACK for each PUCCH cell group by using the PUCCH resource for the scheduling request. That is, for example, when 2-bit (b(0), b(1)) information bits are transmitted by using the PUCCH resource for the scheduling request, each of the 2-bit (b(0), b(1)) information bits corresponds to one PUCCH cell group.

In a scheduling request transmission instance in which signaling of the scheduling request by using the PUCCH is instructed from the MAC layer, the scheduling request transmission instance not accompanying the PUCCH, upon occurrence of transmission of the HARQ-ACK using the PUCCH format 3 in the PUCCH serving cell in which the PUCCH resource for the scheduling request is configured, the PUCCH resource for the HARQ-ACK and the PUCCH format 3 in the PUCCH serving cell in which the PUCCH resource for the scheduling request is configured are used to transmit both the HARQ-ACK and the scheduling request.

In a scheduling request transmission instance in which signaling of the scheduling request by using the PUCCH is instructed from the MAC layer, the scheduling request transmission instance not accompanying the PUSCH, upon occurrence of transmission of the HARQ-ACK using the PUCCH format 3 in the PUCCH serving cell other than the PUCCH serving cell in which the PUCCH resource for the scheduling request is configured, it may be possible to simultaneously perform transmission of the HARQ-ACK using the PUCCH resource for the HARQ-ACK and the PUCCH format 3 in the PUCCH serving cell other than the PUCCH serving cell in which the PUCCH resource for the scheduling request is configured, and transmission of the positive scheduling request using the PUCCH resource for the scheduling request and the PUCCH format 1 in the PUCCH serving cell in which the PUCCH resource for the scheduling request is configured.

In a scheduling request transmission instance in which signaling of the scheduling request by using the PUCCH is instructed from the MAC layer, the scheduling request transmission instance not accompanying the PUCCH, upon occurrence of transmission of the HARQ-ACK using the PUCCH format 3 in the PUCCH serving cell other than the PUCCH serving cell in which the PUCCH resource for the scheduling request is configured, transmission of the HARQ-ACK using the PUCCH resource for the HARQ-ACK and the PUCCH format 3 in the PUCCH serving cell other than the PUCCH serving cell in which the PUCCH resource for the scheduling request is configured, may be performed, and transmission of the positive scheduling request using the PUCCH resource for the scheduling request and the PUCCH format 1 in the PUCCH serving cell in which the PUCCH resource for the scheduling request is configured, may be dropped.

In a scheduling request transmission instance in which signaling of the scheduling request by using the PUCCH is instructed from the MAC layer, the scheduling request transmission instance not accompanying the PUCCH, upon occurrence of transmission of the HARQ-ACK using the PUCCH resource for the HARQ-ACK and the PUCCH format 3 in the PUCCH serving cell other than the PUCCH serving cell in which the PUCCH resource for the scheduling request is configured, transmission of the HARQ-ACK using the PUCCH format 3 in the PUCCH serving cell other than the PUCCH serving cell in which the PUCCH resource for the scheduling request is configured, may be dropped, and transmission of the positive scheduling request using the PUCCH resource for the scheduling request and the PUCCH format 1 in the PUCCH serving cell in which the PUCCH resource for the scheduling request is configured, may be performed.

In a scheduling request transmission instance in which signaling of the scheduling request by using the PUCCH is instructed from the MAC layer, the scheduling request transmission instance not accompanying the PUCCH, upon occurrence of transmission of the HARQ-ACK using the PUCCH format 3 in the PUCCH serving cell other than the PUCCH serving cell in which the PUCCH resource for the scheduling request is configured, both the HARQ-ACK and the scheduling request in the PUCCH serving cell other than the PUCCH serving cell in which the PUCCH resource for the scheduling request is configured are transmitted by using the PUCCH resource for the HARQ-ACK and the PUCCH format 3.

Activation and deactivation of the serving cell according to the present embodiment will be described, below.

The primary cell is always activated. A network (base station device 3) is capable of activating and deactivating a configured secondary cell by transmitting an activated/deactivated medium access control (MAC) control element (CE). The terminal device 1 activates, on the basis of reception of an activated/deactivated MAC CE instructing activation of a configured serving cell, the configured secondary cell. The terminal device 1 deactivates, on the basis of reception an activated/deactivated MAC CE instructing deactivation of a configured serving cells, the configured secondary cell. The terminal device 1 includes a sCellDeactivationTimer for each configured secondary cell, and when the sCellDeactivationTimer expires, the terminal device 1 deactivates the related secondary cell.

The terminal device 1 applies, to an activated secondary cell, (1) monitoring of PDCCH in the activated secondary cell, (2) monitoring of PDCCH for the activated secondary cell, (3) transmission of an SRS in the deactivated secondary cell, and (4) a normal secondary cell operation including reporting of a CSI for the deactivated secondary cell.

When a secondary cell is deactivated, the terminal device 1 does not: (1) monitor PDCCH in the deactivated secondary cell; (2) monitor PDCCH for the deactivated secondary cell; (3) transmit an SRS in the deactivated secondary cell; (4) report a CSI for the deactivated secondary cell; (5) transmit the UL-SCH in the deactivated secondary cell; (6) transmit MACH in the deactivated secondary cell; and (7) transmit a scheduling request in the deactivated secondary cell. That is, while a secondary cell is deactivated, the terminal device 1 is not capable of performing transmission by the PUCCH resource PUCCH format 1) for the scheduling request in the deactivated secondary cell. That is, while a secondary cell is deactivated, the PUCCH resource (PUCCH format 1) for the scheduling request in the deactivated secondary cell is invalid.

The PUCCH secondary cell in which the PUCCH resource for the scheduling request is configured may be always activated. That is, the activated/deactivated MAC CE and the sCellDeactivationTimer may not be applied to the PUCCH secondary cell in which the PUCCH resource for the scheduling request is configured. The activated/deactivated MAC CE and the sCellDeactivationTimer are applied to the PUCCH secondary cell in which the PUCCH resource for the scheduling request is not configured.

That is, when the PUCCH resource for the scheduling request is configured in the PUCCH secondary cell, the activated/deactivated MAC CE and the sCellDeactivationTimer may not be applied to the PUCCH secondary cell. In the PUCCH secondary cell, when the PUCCH resource for the scheduling request is not configured and the PUCCH resource for the HARQ-ACK and/or the CSI is configured, the activated/deactivated MAC CE and the sCellDeactivationTimer may be applied to the PUCCH secondary cell.

That is, in the secondary cell, when the PUCCH resource for the scheduling request is configured, the activated/deactivated MAC CE and the sCellDeactivationTimer may not be applied to the secondary cell. In the secondary cell, when the PUCCH resource for the scheduling request is not configured, the activated/deactivated MAC CE and the sCellDeactivationTimer may be applied to the secondary cell.

Furthermore, the secondary cell in which the PUCCH resource for the scheduling request, HARQ-ACK, and/or the CSI is configured may be always activated.

That is, in the secondary cell, when the PUCCH resource for the scheduling request, the HARQ-ACK, and/or the CSI is configured, the activated/deactivated MAC CE and the sCellDeactivationTimer may not be applied to the secondary cell. In the secondary cell, when the PUCCH resource for the scheduling request, the HARQ-ACK, and the CSI is not configured, the activated/deactivated MAC CE and the sCellDeactivationTimer may be applied to the secondary cell.

Furthermore, the PUCCH secondary cell in which the PUCCH resource for the scheduling request is configured, may be deactivated on the basis of the activated/deactivated MAC CE and the sCellDeactivationTimer.

A constitution of a device according to the present embodiment will be described below.

Figure 4:
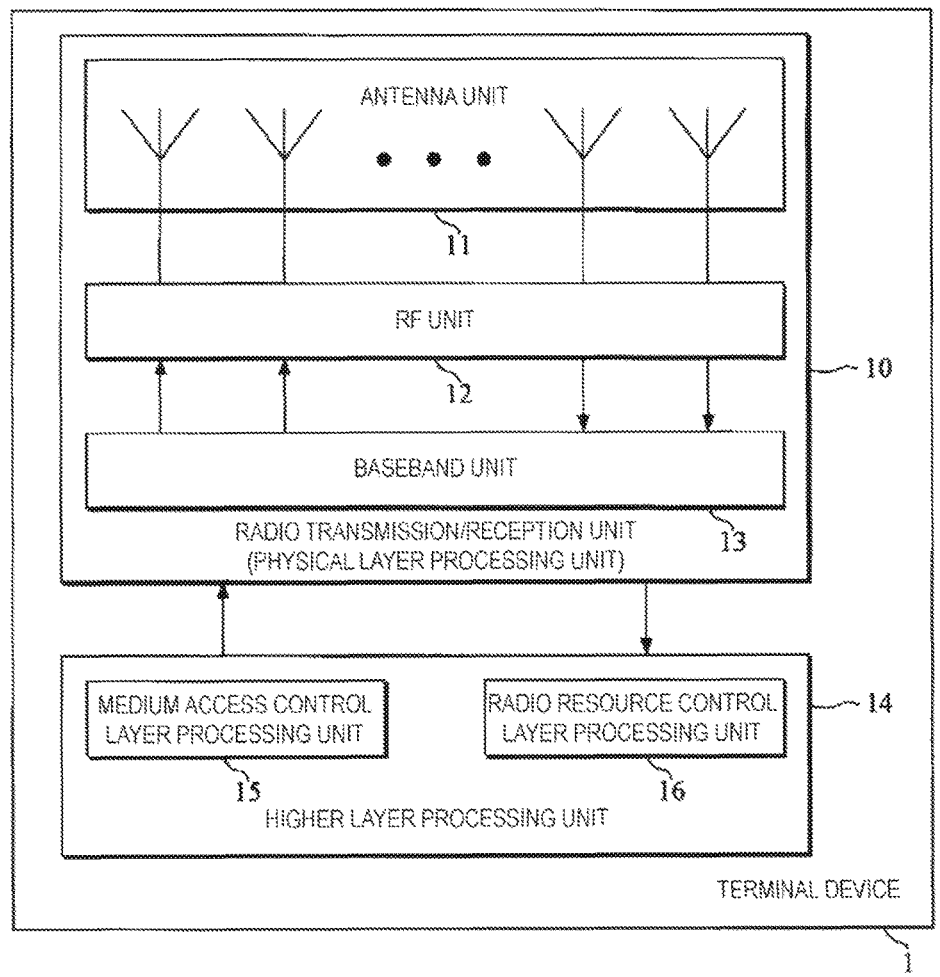
FIG. 4 is a schematic block diagram illustrating a constitution of a terminal device 1 according to the present embodiment.

FIG. 4 is a schematic block diagram illustrating e constitution of the terminal device 1 according to the present embodiment. As illustrated in the figure, the terminal device 1 is constituted to include a radio transmission/reception unit 10 and a higher layer processing unit 14. The radio transmission/reception unit 10 is constituted to include an antenna unit 11, a radio frequency (RF) unit 12, and a baseband unit 13. The higher layer processing unit 14 is constituted to include a medium access control layer processing unit 15 and a radio resource control layer processing unit 16. The radio transmission/reception unit 10 is also referred to as a transmission unit, a reception unit, or a physical layer processing unit.

The higher layer processing unit 14 outputs uplink data (transport block) generated by a user operation or the like, to the radio transmission/reception unit 10. The higher layer processing unit 14 performs processing of the medium access control (MAC) layer, a packet data convergence protocol (PDCP) layer, a radio link control (RLC) layer, and a radio resource control (RRC)

The medium access control layer processing unit 15 provided in the higher layer processing unit 14 performs processing of the medium access control layer. The medium access control layer processing unit 15 controls, on the basis of various types of configuration information/parameters managed by the radio resource control layer processing unit 16, to transmit a scheduling request.

The radio resource control layer processing unit 16 provided in the higher layer processing unit 14 performs processing of the radio resource control layer. The radio resource control layer processing unit 16 manages various types of configuration information/parameters of the terminal device 1 itself. The radio resource control layer processing unit 16 sets the various types of configuration information/parameters on the basis of a higher layer signal received from the base station device 3. Specifically, the radio resource control layer processing unit 16 sets the various types of configuration information/parameters on the basis of information indicating the various types of configuration information/parameters received from the base station device 3.

The radio transmission/reception unit 10 performs processing, such as modulation, demodulation, coding, and decoding, of the physical layer. The radio transmission/reception unit 10 demultiplexes, demodulates, and decodes a signal received from the base station device 3, and outputs the decoded information to the higher layer processing unit 14. The radio transmission/reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes an unnecessary frequency component. The RF unit 12 outputs an analog signal thus processed to the baseband unit.

The baseband unit 13 converts the analog signal input from the RF unit 12 into a digital signal. The baseband unit 13 removes a portion corresponding to a cyclic prefix (CP) from the digital signal resulting from the conversion, performs fast Fourier transform (FFT) on the signal from which the CP has been removed, and extracts a signal in the frequency domain.

The baseband unit 13 performs inverse fast Fourier transform (IFFT) on data, generates an SC-FDMA symbol, attaches a CP to the generated SC-FDMA symbol, generates a digital signal in a baseband, and converts the digital signal in the baseband into an analog signal. The baseband unit 13 outputs the analog signal resulting from the conversion, to the RF unit 12.

The RF unit 12 uses a low-pass filter to remove an unnecessary frequency component from the analog signal input from the baseband unit 13, up-converts the analog signal into a signal of a carrier frequency, and transmits the up-converted signal via the antenna unit 11. Furthermore, the RF unit 12 amplifies the electrical power. In addition, the RF unit 12 may be provided with a function of controlling transmit power. The RF unit 12 is also referred to as a transmission power control unit.

Figure 5:
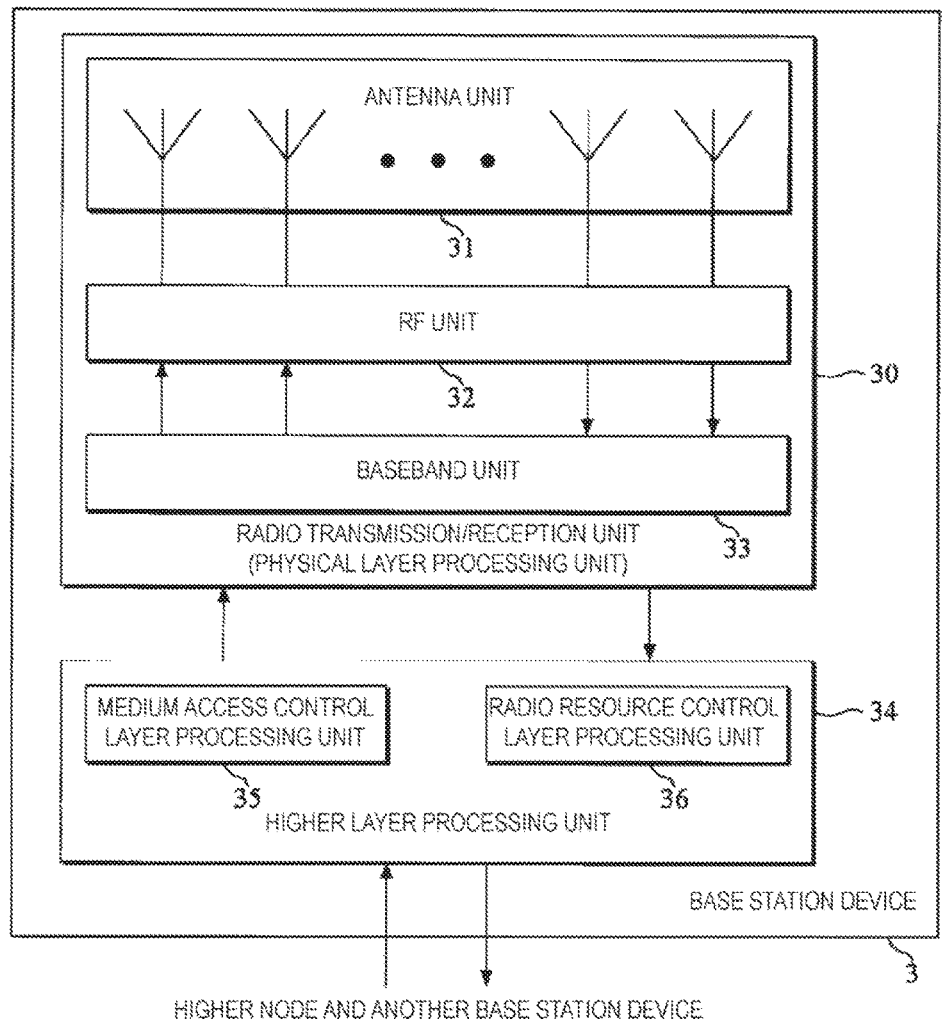
FIG. 5 is a schematic block diagram illustrating a constitution of a base station device 3 according to the present embodiment.

FIG. 5 is a schematic block diagram illustrating a constitution of the base station device 3 according to the present embodiment. As illustrated in the figure, the base station device 3 is constituted to include a radio transmission/reception unit 30 and a higher layer processing unit 34. The radio transmission/reception unit 30 is constituted to include an antenna unit 31, an RF unit 32, and a baseband unit 33. The higher layer processing unit 34 is constituted to include a medium access control layer processing unit 35 and a radio resource control layer processing unit 36. The radio transmission/reception unit 30 is also referred to as a transmission unit, a reception unit, or a physical layer processing unit.

The higher layer processing unit 34 performs processing of the medium access control (MAC) layer, the packet data convergence protocol (PDCP) layer, the radio link control (RLC) layer, and the radio resource control (RRC)

The medium access control layer processing unit 35 provided in the higher layer processing unit 34 performs processing of the medium access control layer. The medium access control layer processing unit 35 performs, on the basis of various types of setting information/parameters managed by the radio resource control layer processing unit 36, processing related to the scheduling request.

The radio resource control layer processing unit 36 provided in the higher layer processing unit 34 performs processing of the radio resource control layer. The radio resource control layer processing unit 36 generates, or acquires from a higher node, downlink data (transport block) arranged on a physical downlink shared channel, system information, an RRC message, a MAC control element (CE), and the like, and outputs a result of the generation or the acquirement to the radio transmission/reception unit 30. Furthermore, the radio resource control layer processing unit 36 manages various types of configuration information/parameters for each of the terminal devices 1. The radio resource control layer processing unit 36 may set various types of configuration information/parameters for each of the terminal devices 1 via a higher layer signal. That is, the radio resource control layer processing unit 36 transmits/broadcasts information indicating various types of configuration information/parameters.

A function of the radio transmission/reception unit 30 is similar to that of the radio transmission/reception unit 10, and hence description thereof is omitted.

(1) A terminal device according to the present embodiment is a terminal device configured to communicate with a base station device by using two serving cells including one primary cell. The device may include: a reception unit configured to receive information indicating a parameter about a random access procedure on the primary cell, information indicating a parameter about a random access procedure on a serving cell other than the primary cell, and information indicating a resource for a physical uplink control channel for a scheduling request, in the serving cell other than the primary cell; a transmission unit configured to transmit a scheduling request used for requesting an uplink shared channel (UL-SCH) resource for an initial transmission, via the physical uplink control channel, in the serving cell other than the primary cell; and a MAC layer processing unit configured to increment a value of a counter by 1 and instruct the transmission unit to transmit the scheduling request via the physical uplink control channel in the serving cell other than the primary cell, in a first case, in which a condition is satisfied that includes at least conditions that at least one scheduling request is pending in a certain transmission time interval (TTI), there is no UL-SCH resource available for transmission in the certain TTI, and the terminal device has a valid resource for the physical uplink control channel for the scheduling request configured for the certain TTI, when the value of the counter is smaller than a prescribed value, and configured to initiate a random access procedure on the primary cell, to release the resource for the physical uplink control channel for the scheduling request in the serving cell other than the primary cell, and to cancel all pending scheduling requests, in the first case when the value of the counter is equal to the prescribed value or larger than the prescribed value.

(2) A terminal device according to the present embodiment is a terminal device configured to communicate with a base station device by using two serving cells including one primary cell. The device may include: a reception unit configured to receive information indicating a parameter about a random access procedure on the primary cell, information indicating a parameter about a random access procedure on a serving cell other than the primary cell, and information indicating a resource for a physical uplink control channel for a scheduling request, in the serving cell other than the primary cell; a transmission unit configured to transmit a scheduling request used for requesting an uplink shared channel (UL-SCH) resource for an initial transmission, via the physical uplink control channel, in the serving cell other than the primary cell; and a MAC layer processing unit configured to initiate the random access procedure on the primary cell and cancel all pending scheduling requests, in a first case, in which a condition is satisfied that includes at least conditions that at least one scheduling request is pending in a certain transmission time interval (TTI), there is no UL-SCH resource available for transmission in the certain TTI, the terminal device has a valid resource for the physical uplink control channel for the scheduling request configured for the certain TTI, and the serving cell other than the primary cell is deactivated.

(3) A terminal device according to the present embodiment is a terminal device configured to communicate with a base station device by using two serving cells including one primary cell. The device may include: a transmission unit configured to transmit a scheduling request used for requesting an uplink shared channel (UL-SCH) resource for an initial transmission, via the physical uplink control channel, in the primary cell or in a serving cell other than the primary cell; and a MAC layer processing unit configured to increment a value of a counter by 1 and to instruct, the transmission unit to transmit a scheduling request via, the physical uplink control channel in the primary cell or in the serving cell other than the primary cell, in a case, in which a condition is satisfied that includes at least conditions that at least one scheduling request is pending in a certain transmission time interval (TTI), there is no UL-SCH resource available for transmission in the certain TTI, the terminal device has a valid resource for the physical uplink control channel for the scheduling request configured, in the primary cell or the serving cell other than the primary cell, for the certain TTI, when the value of the counter is smaller than a prescribed value, configured to instruct RRC to release the physical uplink control channel for all serving cells, in a case, in which a condition is satisfied that includes at least conditions that at least one scheduling request is pending in the certain TTI, there is no UL-SCH resource available for transmission in the certain TTI, and the terminal device has the valid resource for the physical uplink control channel for the scheduling request configured, in the primary cell, for the certain TTI, when the value of the counter is equal to the prescribed value or larger than the prescribed value, and configured to instruct the RRC to release the physical uplink control channel for the serving cell other than the primary cell, in a case, in which a condition is satisfied that includes at least conditions that at least one scheduling request is pending in the certain TTI, there is no UL-SCH resource available for transmission in the certain TTI, and the terminal device has the valid resource for the physical uplink control channel for the scheduling request configured, in the serving cell other than the primary cell, for the certain TTI, when the value of the counter is equal to the prescribed value or larger than the prescribed value.

(4) The MAC layer processing unit provided in the terminal device according to the present embodiment may not release the physical uplink control channel for the primary cell in a case in which a condition is satisfied that includes at least conditions that at least one scheduling request is pending in a certain TTI, there is no UL-SCH resource available for transmission in the certain TTI, and the terminal device has a valid resource for the physical uplink control channel for the scheduling request configured, in the serving cell other than the primary cell, for the certain TTI, when the value of the counter is equal to the prescribed value or larger than the prescribed value.

(5) A terminal device according to the present embodiment is a terminal device configured to communicate with a base station device by using two serving cells including one primary cell. The device may include: a transmission unit configured to transmit a scheduling request used for requesting an uplink shared channel (UL-SCH) resource for an initial transmission, via the physical uplink control channel, in the primary cell or in a serving cell other than the primary cell; and a MAC layer processing unit configured to increment a value of a counter by 1 and to instruct the transmission unit to transmit the scheduling request via the physical uplink control channel in the primary cell or in the serving cell other than the primary cell, in a first case, in which a condition is satisfied that includes at least conditions that at least one scheduling request is pending in a certain transmission time interval (TTI), there is no UL-SCH resource available for transmission in the certain TTI, the terminal device has a valid resource for the physical uplink control channel for the scheduling request configured in the primary cell or in the serving cell other than the primary cell, for the certain TTI, when the value of the counter is smaller than a prescribed value, configured to instruct RRC to release the physical uplink control channel for all serving cells, in a case, in which a condition is satisfied that includes at least conditions that at least one scheduling request is pending in a certain TTI, there is no UL-SCH resource available for transmission in the certain TTI, and the terminal device has a valid resource for the physical uplink control channel for the scheduling request configured, in the primary cell, for the certain TTI, when the value of the counter is equal to the prescribed value or larger than the prescribed value, and configured to instruct the RRC to release the physical uplink control channel for the serving cell other than the primary cell, in a case, in which a condition is satisfied that includes at least conditions that at least one scheduling request is pending in a certain TTI, there is no UL-SCH resource available for transmission in the certain TTI, and the terminal device has a valid resource for the physical uplink control channel for the scheduling request configured, in the serving cell other than the primary cell, for the certain TTI, when the value of the counter is equal to the prescribed value or larger than the prescribed value.

(6) A terminal device according to the present embodiment is a terminal device configured to communicate with a base station device by using two serving cells including one primary cell. The device may include: a transmission unit configured to transmit a scheduling request used for requesting an uplink shared channel (UL-SCH) resource for an initial transmission, via the physical uplink control channel, in the primary cell or in a serving cell other than the primary cell; and a MAC layer processing unit configured to increment a value of a counter by 1 and instruct the transmission unit to transmit the scheduling request via the physical uplink control channel in the primary cell or in the serving cell other than the primary cell, in a case, in which a condition is satisfied that includes at least conditions that at least one scheduling request is pending in a certain transmission time interval (TTI), there is no UL-SCH resource available for transmission in the certain TTI, and the terminal device has a valid resource for the physical uplink control channel for the scheduling request configured in the primary cell or in a serving cell other than the primary cell, for the certain TTI, when the value of the counter is smaller than a prescribed value, configured to clear a configured downlink assignment and a configured uplink grant in a case in which a condition is satisfied that includes at least conditions that at least one scheduling request is pending in a certain TTI, there is no UL-SCH resource available for transmission in the certain TTI, and the terminal device has a valid resource for the physical uplink control channel for the scheduling request configured, in the primary cell, for the certain TTI, when the value of the counter is equal to the prescribed value or larger than the prescribed value, and configured to not clear the configured downlink assignment and the configured uplink grant in a case in which a condition is satisfied that includes at least conditions that at least one scheduling request is pending in a certain TTI, there is no UL-SCH resource available for transmission in the certain TTI, and the terminal device has a valid resource for the physical uplink control channel for the scheduling request configured, in the serving cell other than the primary cell, for the certain TTI when the value of the counter is equal to the prescribed value or larger than the prescribed value.

(7) A terminal device according to the present embodiment is a terminal device configured to communicate with a base station device by using two serving cells including one primary cell. The device may include: a transmission unit configured to transmit a physical uplink control channel in each of the primary cell and the serving cell other than the primary cell; and a MAC layer processing unit configured to activate and deactivate, on the basis of a MAC control element, the serving cell other than the primary cell, when a resource for the physical uplink control channel for a scheduling request used for requesting an uplink shared channel (UL-SCH) resource for an initial transmission is not configured, in the serving cell other than the primary cell. When the resource for the physical uplink control channel for the scheduling request is configured in the serving cell other than the primary cell, the serving cell other than the primary cell may be always activated.

(8) A base station device according to the present embodiment is a terminal device configured to communicate with a terminal device by using two serving cells including one primary cell. The device may include: a reception unit configured to receive a physical uplink control channel in each of the primary cell and the serving cell other than the primary cell; and a MAC layer processing unit configured to activate and deactivate, by transmitting a MAC control element, the serving cell other than the primary cell, when a resource for the physical uplink control channel for a scheduling request used for requesting an uplink shared channel (UL-SCH) resource for an initial transmission is not configured, in the serving cell other than the primary cell. When the resource for the physical uplink control channel for the scheduling request is configured in the serving cell other than the primary cell, the serving cell other than the primary cell may be always activated.

As a result, the terminal device 1 is capable of efficiently communicating with the base station device 3.

A program operating on the base station device 3 and the terminal device 1 according to the present invention may be a program that controls a central processing unit (CPU) and the like (a program for causing a computer to function) to realize the functions according to the above-described embodiment of the present invention. The information handled in these devices is temporarily accumulated in a random access memory (RAM) while being processed. Thereafter, the information is stored in various types of read only memories (ROMs) such as a flash ROM and a hard disk drive (HDD) and, when necessary, is read by the CPU to be modified or rewritten.

Note that the terminal device 1 and the base station device 3 according to the above-described embodiment may be partially realized by the computer. This configuration may be realized by recording a program for realizing such control functions on a computer-readable medium and causing a computer system to read the program recorded on the recording medium for execution.

Moreover, the "computer system" used herein is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment is also capable of communicating with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and the integrated circuit may be realized with a dedicated circuit or a general-purpose processor. Furthermore, if with advances in the semiconductor technology, a circuit integration technology with which an LSI is replaced appears, it is also possible to use an integrated circuit based on the technology.

Furthermore, according to the above-described embodiment, the terminal device is described as one example of a communication device, hut the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific constitution is not limited to the embodiment and includes, for example, an amendment to a design that falls within the scope that does not depart from the gist of the present invention. Furthermore, various modifications are possible within the scope of claims, and embodiments that are made by suitably combining technical means disclosed according to the different embodiments are also included in the technical scope of the present invention. Furthermore, a constitution in which a constituent element that achieves the same effect is substituted for the one that is described according to the embodiment is also included in the technical scope of the present invention.

DESCRIPTION OF REFERENCE NUMERALS 1 (1A, 1B, 1C) Terminal device
3 Base station device
10 Radio transmission/reception unit
11 Antenna unit
12 RF unit
13 Baseband unit
14 Higher layer processing unit
15 Medium access control layer processing unit 16 Radio resource control layer processing unit
30 Radio transmission/reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
MAC (Medium Access Control) layer processing circuitry configured to and/or programmed to initiate a random access procedure on a first serving cell, and initiate a random access procedure on a second serving cell, and
in a case in which at least one scheduling request is pending, no UL-SCH (uplink shared channel) resources are available for a transmission, the terminal apparatus has a valid PUCCH (Physical Uplink Control Channel) resource for the scheduling request, and a value of a counter is smaller than a predetermined value, increment the value of the counter by 1 and instruct transmission circuitry to transmit the scheduling request on the valid PUCCH resource; and
transmission circuitry configured to and/or programmed to, in a case in which the valid PUCCH resource for the scheduling request is configured only on the second serving cell, transmit the scheduling request on the valid PUCCH resource on the second serving cell, wherein
the MAC layer processing circuitry is further configured to and/or programmed to initiate the random access procedure on the first serving cell out of the first serving cell and the second serving cell, the first serving cell being indicated in a handover procedure and the PUCCH resource for the scheduling request being configured on the second serving cell, in a case in which at least one scheduling request is pending, no UL-SCH resources are available for the transmission, the terminal apparatus has the valid PUCCH resource for the scheduling request, and the value of the counter is equal to or larger than the predetermined value, and
the transmission circuitry is further configured to and/or programmed to
in a case that a HARQ transmission with PUCCH format 1a/1b coincides with a positive scheduling request transmission in a subframe in different serving cells, transmit the HARQ-ACK in the subframe on PUCCH resource for the HARQ-ACK in one of the different serving cells and transmit the positive scheduling request with PUCCH format 1a/1b in the subframe on PUCCH resource for the positive scheduling request in the other of the different serving cells, and
in a case that a HARQ-ACK transmission with PUCCH format 1a/1b coincides with a positive scheduling request transmission in a subframe in a same serving cell, transmit the HARQ-ACK in the subframe on PUCCH resource for the positive scheduling request in the same serving cell.

2. The terminal apparatus according to claim 1, wherein the MAC layer processing circuitry is configured to and/or programmed to, in a case in which at least one scheduling request is pending, no UL-SCH resources are available for the transmission, the terminal apparatus has the valid PUCCH resource for the scheduling request, and the value of the counter is equal to or larger than the predetermined value, notify RRC (Radio Resource Control) layer to release the PUCCH for the second serving cell and cancel all pending scheduling requests.

3. The terminal apparatus according to claim 1, wherein the scheduling request is used for requesting UL-SCH resources for a new transmission.

4. A communication method of a terminal apparatus, the communication method comprising:
initiating a random access procedure on a first serving cell, and initiating a random access procedure on a second serving cell;
incrementing the value of the counter by 1 and instructing transmission circuitry included in the terminal apparatus to transmit the scheduling request on the valid PUCCH resource, in a case in which at least one scheduling request is pending, no UL-SCFI (uplink shared channel) resources are available for a transmission, the terminal apparatus has a valid PUCCH (Physical Uplink Control Channel) resource for the scheduling request, and a value of a counter is smaller than a predetermined value;
transmitting the scheduling request on the valid PUCCH resource on the secondary cell, in a case in which the valid PUCCH resource for the scheduling request is configured only on the second serving cell; and
initiating the random access procedure on the first serving cell out of the first serving cell and the second serving cell, the first serving cell being indicated in a handover procedure and the PUCCH resource for the scheduling request being configured on the second serving cell, in a case in which at least one scheduling request is pending, no UL-SCH resources are available for the transmission, the terminal apparatus has the valid PUCCH resource for the scheduling request, and the value of the counter is equal to or larger than the predetermined value,
in a case that a HARQ transmission with PUCCH format 1a/1b coincides with a positive scheduling request transmission in a subframe in different serving cells, transmitting the HARQ-ACK in the subframe on PUCCH resource for the HARQ-ACK in one of the different serving cells and transmitting the positive scheduling request with PUCCH format 1a/1b in the subframe on PUCCH resource for the positive scheduling request in the other of the different serving cells, and
in a case that a HARQ-ACK transmission with PUCCH format 1a/1b coincides with a positive scheduling request transmission in a subframe in a same serving cell, transmitting the HARQ-ACK in the subframe on PUCCH resource for the positive scheduling request in the same serving cell.

* * * * *